Figure 1A:
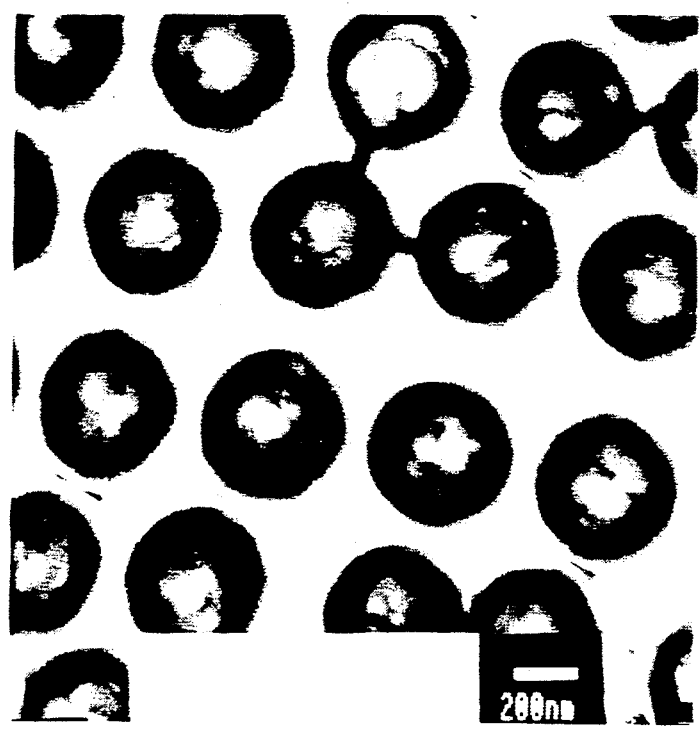

United States Patent [19]

Touda et al.

[11] Patent Number: 5,077,320
[45] Date of Patent: Dec. 31, 1991

[54] MICROVOID-CONTAINING POLYMER PARTICLES

[75] Inventors: Hideki Touda, Yokohama; Yukio Takagishi, Kawasaki, both of Japan

[73] Assignee: Nippon Zeon Co., Ltd., Tokyo, Japan

[21] Appl. No.: 542,073

[22] Filed: Jun. 22, 1990

[30] Foreign Application Priority Data

Jun. 23, 1989 [JP] Japan ................................. 1-162031

[51] Int. Cl.$^5$ .............................................. C08J 9/28
[52] U.S. Cl. ..................................................... 521/65
[58] Field of Search ........................................ 521/65

[56] References Cited

U.S. PATENT DOCUMENTS 3,939,135 2/1976 Hwa et al. ............................ 521/65
4,910,229 3/1990 Okubo ................................... 521/65

Primary Examiner—John Kight, III
Assistant Examiner—John M. Cooney, Jr.
Attorney, Agent, or Firm—Griffin Branigan & Butler

[57] ABSTRACT

A process for producing polymer particles containing one microvoid or two or more discrete microvoids, which comprises
(1) adding a base to a latex of a carboxyl-modified copolymer containing 0.1 to 1000 parts of an organic solvent per 100 parts by weight of the carboxyl-modified copolymer to neutralize at least part of the carboxyl groups in the copolymer, and
(2) adding an acid to the latex to adjust the pH of the latex to not more than 7.

8 Claims, 2 Drawing Sheets

MICROVOID-CONTAINING POLYMER PARTICLES

This invention relates to a process for producing microvoid-containing polymer particles. More specifically, it relates to a process for producing microvoid-containing polymer particles having a high glass transition temperature easily within a short period of time. The invention also relates to microvoid-containing polymer particles obtained by the aforesaid process, and a latex containing these microvoid-containing polymer particles.

Latices containing microvoid-containing polymer particles have previously been widely used in water-base coating composition or paper coating compositions. Since, the microvoid-containing polymer particles well scatter light and reduce perviousness of light as compared with polymers filled uniformly in particles (filled polymers), they have found extensive applications as white pigments having excellent optical properties such as hiding power, opacity and whiteness. When a coated film is formed from a composition obtained by dispersing filled polymer particles in a binder polymer, light is hardly scattered because there is little difference between the refractive index of the filled polymer particles and that of the binder polymer. However, when polymer particles having microvoids (air layer) inside are used, light passes at least twice through the interface between an air layer and a polymer layer which differ greatly from each other in refractive index. Consequently, the light is greatly scattered, and the opacity of the coated film increases.

Some methods have been known for the production of microvoid-containing polymer particles. For example, U.S. Pat. No. 4,863,973, EP 301880A, GB 2207680A, or FR 2618790A discloses a method of making microvoid-containing polymer particles which comprises swelling polymer particles consisting of a core portion and a sheath portion with a base in the absence of an organic solvent. This method, however, requires polymerization in two steps because the core portion and a sheath portion are formed of different polymers, and the process becomes complex.

U.S. Pat. No. 4,427,836, U.S. Pat. No. 4,468,498, EP 22633A, DE 3070204G, or DE 3072033G discloses a method of obtaining microvoid-containing polymer particles, which comprises preparing core particles by polymerizing at least one unsaturated carboxylic acid, thereafter to form a surface layer of particles (shell portion) on the core particles, polymerizing an ethylenically unsaturated monomer having a different composition from the core portion, and neutralizing and swelling the resulting particles with a volatile base such as ammonia. However, this method also requires polymerization in two steps because the core portion and the shell portion are formed of different polymers. Accordingly, the process becomes complex. In this method, it is important to cover-polymerize the ethylenically unsaturated monomer only on the surface layer of the seed particles. However, it is difficult to control the amount of a surface-active agent, and in many cases, new particles are formed, or the unsaturated carboxylic acid in the seed particles move to the final particle surfaces.

U.S. Pat. No. 4,798,691, EP 198089A or WO 8602017A discloses a method of producing microvoid-containing polymer particles, which comprises polymerizing monomer components in a dispersion containing monomer components containing a hydrophilic monomer and a crosslinkable monomer and an oily substance to form capsular polymer particles containing the oily substance, and removing the oily substance from the polymer particles. This method might sometimes give particles in which the shell is partly dented. Furthermore, according to this method, microvoid-containing polymer particles cannot be obtained unless the oily substance and the polymer are completely phase-separated from each other in the polymer particles and the oily substance is enclosed in the interiors of the polymer particles. Otherwise, the polymer particles become porous particles. Thus, it is necessary to use a large amount of the crosslinkable monomer and also to use a large amount of a hydrophilic monomer.

Japanese Laid-Open Patent Publication No. 1704/1989 discloses a method of producing microvoid-containing polymer particles, which comprises synthesizing a copolymer comprising copolymer units derived from an unsaturated carboxylic acid monomer by a one-step polymerization procedure, neutralizing and swelling the copolymer with a base, and treating the copolymer with an acid. In this method, the carboxyl groups in the polymer particles should be neutralized. To have the base required for neutralization sufficiently permeate the interiors of the polymer particles, it is necessary to raise the treating temperature to above the glass transition temperature (Tg) of the polymer in the polymer particles. Hence, in this method, the Tg of the polymer cannot be preset at too high a point. If the microvoid-containing polymer particles are used as a white pigment in a coating composition which will be heated and dried, improvement are difficult to obtain with regard to optical properties such as whiteness and opacity.

It is an object of this invention to provide microvoid-containing polymer particles and a process for producing such polymer particles, which are free from the aforesaid defects.

As a result of extensive investigations in order to solve this problem, the present inventors have found that if the polymer particles are swollen with a base in the presence of an organic solvent, microvoid-containing polymer particles can be obtained easily within a short period of time, and microvoid-containing particles of a polymer having a high glass transition temperature can be obtained, and that this process can also give polymer particles having a plurality of microvoids.

Thus, according to this invention, there is provided a process for producing a latex containing microvoid-containing polymer particles, which comprises (1) adding a base to carboxyl-modified copolymer latex containing 0.1 to 1000 parts by weight of an organic solvent per 100 parts by weight of a carboxyl-modified copolymer to thereby neutralize the carboxyl groups in the copolymer at least partially, and then (2) adding an acid to the latex to adjust the pH of the latex to not more than 7.

There are also provided microvoid-containing polymer particles and a latex containing these microvoid-containing polymer particles which are obtained by the above production process.

The carboxyl-modified copolymer used in this invention may be a copolymer of any monomer composition which contains carboxyl groups.

There is no particular limitation on the method of obtaining polymers containing carboxyl groups. Examples are a method of copolymerizing carboxyl-containing monomers, and a method of introducing carboxyl groups into a copolymer by a polymer reaction. The method based on copolymerization is advantageous to production.

Examples of carboxyl-containing monomers that can be used in this invention include ethylenically unsaturated carboxylic acids such as acrylic acid, methacrylic acid, crotonic acid, cinnamic acid, itaconic acid, fumaric acid, maleic acid and butenetricarboxylic acid; and monoalkyl unsaturated dicarboxylates such as monoethyl itaconate, monobutyl fumarate and monobutyl maleate. In the present invention, these carboxyl-containing monomers are used singly or in combination. The amount of the carboxyl-containing monomer is not limited. Preferably, it is 0.1 to 40 parts by weight, more preferably 0.5 to 20 parts by weight, per 100 parts by weight of the entire monomeric mixture. If the amount of the carboxyl-containing monomer is less than 0.1 part by weight, swelling of the copolymer particles with a base does not easily take place, and it is difficult to introduce microvoids into the copolymer. On the other hand, if it exceeds 40 parts by weight, a great amount of a coagulum occurs in obtaining the copolymer by polymerization.

Any monomers which are copolymerizable with the carboxyl-containing monomers used in this invention can be used in this invention. They may be used singly or in combination Examples include aromatic vinyl monomers such as styrene, alpha-methyl styrene, p-methylstyrene and halostyrenes; unsaturated nitriles such as acrylonitrile; (meth)acrylate esters such as methyl (meth)acrylate, ethyl (meth)acrylate, butyl (meth)acrylate, 2-ethylhexyl(meth)acrylate, lauryl (meth)acrylate, glycidyl (meth)acrylate and 2-hydroxyethyl (meth)acrylate; (meth)acrylic acid amide and derivatives thereof such as (meth)acrylamide, N-methylol(meth)acrylamide and N-butoxymethyl(meth)acrylamide; diolefins such as butadiene and isoprene; vinyl halides such as vinyl chloride and vinylidene chloride; and carboxylic acid vinyl esters such as vinyl acetate. As required, crosslinkable monomers such as divinylbenzene, diallyl phthalate, allyl (meth)acrylate, and ethylene glycol di(meth)acrylate may also be used. The latex of the carboxyl-modified copolymer used in this invention is usually produced by an emulsion polymerization method. A copolymer obtained by another polymerization method may be converted to a latex by a phase inversion method. In each of these polymerization methods, a batchwise method, a semi-continuous method and a continuous method may be used. Furthermore, known subsidiary materials for polymerization, such as an emulsifier, a polymerization initiator, a chelating agent, and an electrolyte may be used.

There is no limitation on the polymerization temperature.

In the production of the latex in this invention, a base is added to the carboxyl-modified copolymer in the presence of an organic solvent to neutralize at least a part of the carboxy groups of the copolymer constituting the latex.

There is no particular restriction on the method of including an organic solvent in the carboxyl-modified copolymer latex. For example, an organic solvent is added to a latex obtained by polymerization, or a monomeric mixture is polymerized in the presence of an organic solvent. The organic solvent used in this invention is not particularly limited, and any organic solvent may be used which can fully swell the copolymer particles. Specific examples include aliphatic hydrocarbons such as hexane; aromatic hydrocarbons such as ethylbenzene, xylene, toluene and benzene; halogenated hydrocarbons such as carbon tetrachloride, trichloroethylene and dichloromethane; alcohols such as amyl alcohol, butyl alcohol, cyclohexyl alcohol and benzyl alcohol; phenols such as cresol; ethers such as diethyl ether; ketones such as diisobutyl ketone, methyl isobutyl ketone, methyl isopropyl ketone, methyl ethyl ketone and cyclohexanone; and unsaturated carboxylic acid esters such as amyl acetate, butyl acetate, propyl acetate, ethyl acetate, methyl acetate and ethyl propionate. The organic solvents may be used singly or mixtures of two or more. Of these organic solvents or mixtures thereof, those which have a solubility parameter close to that of the copolymer are preferred. When an organic solvent is added to the latex after preparation of the latex of the carboxyl-modified copolymer, at least one of polymerizable organic solvent may be used. Specific examples of the polymerizable organic solvent include aromatic vinyl compounds such as styrene, halostyrenes and divinylbenzene; unsaturated nitriles such as acrylonitrile; (meth)acrylic acid esters such as methyl (meth)acrylate, ethyl (meth)acrylate, butyl (meth)acrylate and 2-ethylhexyl (meth)acrylate; and diolefins such as butadiene and isoprene.

The amount of the organic solvent is 0.1 to 1000 parts by weight, preferably 1 to 500 parts by weight, especially preferably 10 to 100 parts by weight, per 100 parts by weight of the carboxyl-modified copolymer. If its amount is less than 0.1 part by weight, the polymer particles cannot sufficiently be softened. On the other hand, if its amount exceeds 1000 parts by weight, the monomer particles are too much softened so that they are flocculated.

There is no particular restriction on the type of the base to be used in this invention. Specific examples include alkali metal hydroxides such as sodium hydroxide, potassium hydroxide and lithium hydroxide, alkaline earth metal hydroxides such as calcium hydroxide and magnesium hydroxide; ammonia; amine compounds such as dimethylamine and diethanolamine; alkali metal (bi)carbonates such as sodium carbonate and potassium bicarbonate; and ammonium (bi)carbonates such as ammonium bicarbonate.

The required amount of the base is one sufficient to neutralize at least part of the carboxyl groups in the carboxyl-modified copolymer and to increase the pH of the carboxyl-modified copolymer latex preferably to at least 8, more preferably to at least 10.

To neutralize the carboxyl groups inside the polymer particles with the base, time is required during which the base diffuses in the interiors of the latex particles. Accordingly, after the base is added, the latex is sufficiently stirred. The time varies depending upon the amount of the carboxyl groups, but is usually 10 minutes or more. The stirring time may be shorter when the organic solvent is added to the polymerization system of preparing the carboxyl-modified copolymer latex rather than the organic solvent is added to the latex after is is prepared.

To diffuse the base rapidly in the interiors of the polymer particles, it is generally preferred that the temperature of the latex at that time is higher. Specifically, the temperature is higher than the softening point of the copolymer constituting the latex. In contrast, in the present invention, the neutralization of the carboxyl groups can be carried out at a lower temperature than in the absence of the organic solvent. Specifically, the neutralization can be effected at a lower temperature than the softening point of the copolymer. Accordingly, microvoid-containing particles of a polymer having a high glass transition temperature can be easily obtained by the present invention. The reason for the usability of a lower temperature at the time of neutralization is presumably that the use of an organic solvent enables the carboxyl-modified copolymer to be sufficiently softened at a lower temperature. If it is desired to use much lower temperatures, the amount of the organic solvent may be increased. When the organic solvent is added to the polymerization system at the time of preparing the carboxyl-modified copolymer latex, the amount of the organic solvent may be smaller than that of the organic solvent added to the latex after the preparation of the latex.

When a base is added to the latex for the neutralization of carboxyl groups, the stability of the latex may sometimes be decreased to develop a coagulum. To prevent it, an anionic surface-active agent or a nonionic surface-active agent may be added, if required, to the latex simultaneously with, or before, the addition of the base.

In the process for producing the latex in accordance with this invention, after the carboxyl groups in the carboxyl-modified copolymer are neutralized with the base, an acid is added to the latex to adjust the pH of the latex to not more than 7, preferably not more than 5.

The acid used for this purpose is not particularly limited. It may be a mineral acid such as hydrochloric acid or sulfuric acid or an organic acid such as acetic acid and malonic acid.

Preferably, the acid is added at a temperature at which the copolymer can become pliable.

Usually, after adding the acid, the mixture is stirred for at least 30 minutes to diffuse the acid sufficiently in the interiors of the polymer particles. Thereafter, if required, the latex is cooled to prevent the decrease of the stability of the latex at the time of adding an acid, it is possible, if required, to add an anionic surface-active agent or a nonionic surface-active agent simultaneously with, or before, the addition of the acid.

Then, as required, the organic solvent may be removed from the copolymer latex by a known method such as distillation at reduced pressure or steam distillation. Microvoid-containing polymer particles can be obtained by removing water from the latex of the invention containing microvoid-containing polymer particles by a known method.

Since the microvoid-containing polymer particles obtained by this invention have excellent opacity, they are useful as a pigment for paper coating composition or coating composition.

It has not been known certainly why microvoids are formed in the polymer particles by the process of this invention. This phenomenon, however, can be ascertained by observing the resulting polymer particles under a transmission-type electron microscope. When the polymer particle is observed under a transmission-type electron microscope in the step of acid treatment, it can be determined that first several small voids exist, but with the lapse of time, they become a single microvoid-containing particle. Specifically, depending upon the treating conditions multi-microvoid-containing particles and single-microvoid-containing particles can be obtained. The number and diameter of the microvoids may be controlled by the amount of carboxyl groups in the copolymer, the state of distribution of carboxyl groups in the copolymer particles, the degree of hydrophilicity of the copolymer particles, neutralization treatment conditions with a base, the acid treating conditions, and the type and amount of the organic solvent.

Thus, according to this invention, a latex containing microvoid-containing polymer particles can be produced at a lower temperature than in the prior art. A latex of microvoid-containing polymer particles having a higher glass transition temperature and a latex containing multi-microvoid-containing polymer particles can be produced. From these latices, the above microvoid-containing polymer particles can be obtained.

The following examples further specifically illustrate the present invention. These examples do not limit the present invention. In these examples, all parts and percentages are by weight unless otherwise indicated. The amounts of the latices are calculated as solids. All polymerizations were carried out in an atmosphere of nitrogen which is an inert gas. The weight average particle diameter was determined by a light scattering method (Model 9800 made by Malvern Company).

Figure 1B:
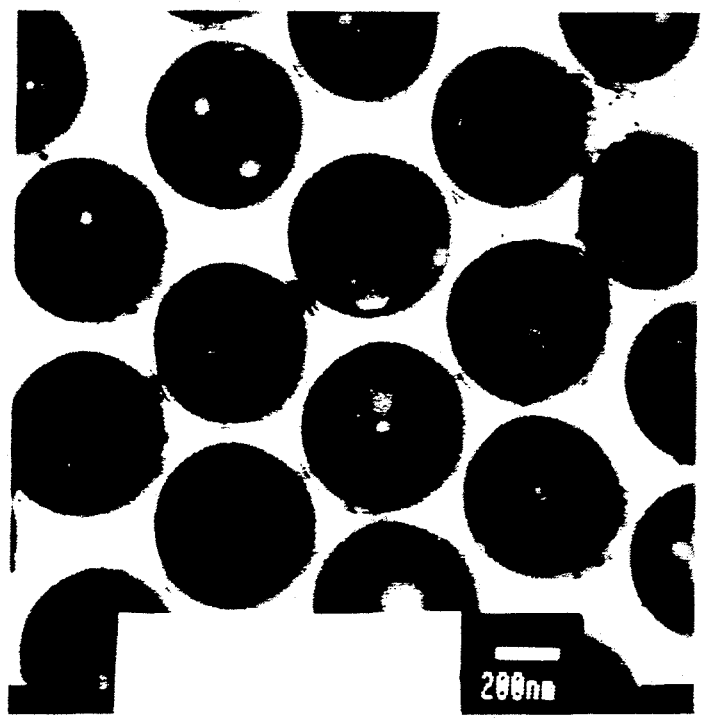
Figure 1C:
Figure 1D:
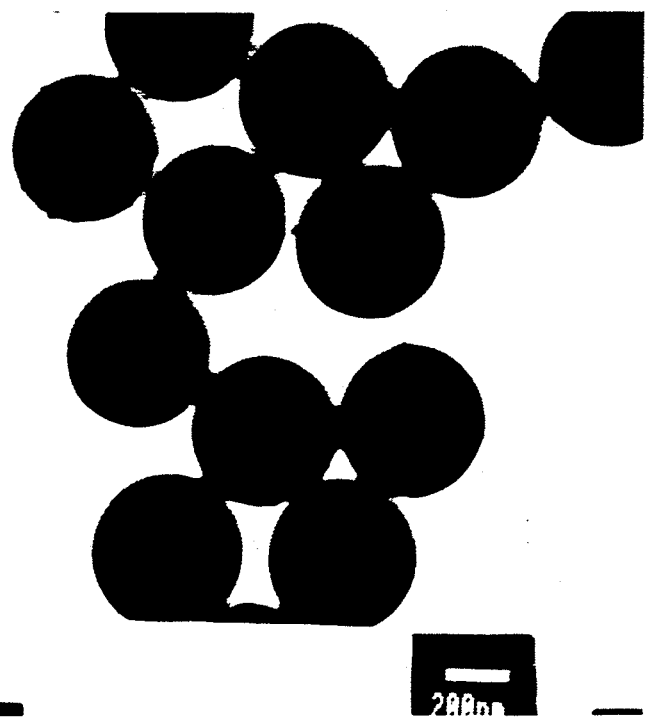

In the accompanying drawings, FIGS. 1 (a), (b) and (c) are electron micrographs showing the particle structure of microvoid-containing particles obtained in Examples 1B, 3B2 and 5B2. FIG. 1 (d) is an electron micrograph showing the particle structure of void-free polymer particles obtained in Comparative Example 1. Each line segment in these drawings represents 200 nm.

EXAMPLE 1S

Synthesis of a seed latex

Deionized water (300 parts) was put in a four-necked flask fitted with a stirrer, a reflux condenser, a thermometer and a dropping funnel. Furthermore, 95 parts of styrene and 5 parts of methacrylic acid were added. The mixture was heated with stirring. After the temperature of the mixture reached 70° C., 17 parts of a 3% aqueous solution of potassium persulfate was added from the dropping funnel, and the reaction was started. The reaction mixture was maintained at 70° C. for three hours to complete the polymerization reaction. The polymerization conversion determined by the weight method was 99%. The resulting latex had a solids concentration of 24%, and a pH of 2.3. It had a weight average particle diameter of 160 nm. This latex was designated as the seed latex [S].

EXAMPLE 1A

Production of a filled polymer latex

The same reactor as used in the production of the seed latex was charged with 518 parts of deionized water and 3.4 parts of the seed latex [S]. After the temperature inside the reactor reached 80° C., 30 parts of a 3% aqueous solution of potassium persulfate was added to the flask from the dropping funnel. The dropping funnel was washed with 20 parts of deionized water, and a monomeric mixture composed of 94 parts of styrene and 6 parts of acrylic acid was added from the dropping funnel over the course of 6 hours. The reaction mixture was then maintained at 80° C. for 2 hours to complete the polymerization reaction. The polymerization conversion determined by the weight method was 97%. The resulting latex Al) had a solids concentration of 15%. The pH and the weight average particle diameter of the latex [A1] were measured, and the results are shown in Table 1.

EXAMPLE 1B

Production of a microvoid-containing latex

The same reactor as used in the production of the seed latex was charged with 870 parts of deionized water, 100 parts of latex [A1], 1 part of sodium dodecylbenzenesulfate, 30 parts of toluene and 33 parts of a 10% aqueous solution of sodium hydroxide, and the mixture was stirred at 80° C. for 3 hours. Then, 300 parts of a 1% aqueous solution of hydrochloric acid was added, and the mixture was stirred at 80° C. for 3 hours. Then, the reaction mixture was cooled to room temperature, and the organic solvent was removed under reduced pressure. The pH of the resulting latex, and the particle diameter of the polymer particles contained in it were measured. When the polymer particles were observed under a transmission-type electron microscope, 1 to 2 small voids could be detected. The diameter of the small voids are shown in Table 1. The glass transition temperature of the polymer particles was measured. The results are also shown in Table 1.

COMPARATIVE EXAMPLE 1

The operation of Example 1B was repeated except that toluene was not used. The pH of the resulting latex and the particle diameter of the polymer particles therein were measured. The results are shown in Table 1. When the polymer particles contained in the latex were observed under a transmission-type electron microscope, small voids could not be seen.

EXAMPLE 2A

Production of a filled polymer latex in the presence of an organic solvent

The same reactor as used in the production of the seed latex was charged with 508 parts of deionized water, 3.4 parts of the seed latex [S], and the contents were heated. After the mixture reached 80° C., 30 parts of a 3% aqueous solution of potassium persulfate was added to the flask through the dropping funnel. Then, the dropping funnel was slushed with 20 parts of deionized water, and mixture of a monomeric mixture composed of 87.7 parts of styrene, 0.3 part of divinylbenzene, 5 parts of methyl methacrylate and 7 parts of methacrylic acid and 10 parts of toluene was added through the dropping funnel over the course of 6 hours. Then, the mixture was maintained at 80° C. for 2 hours to complete the polymerization reaction. The polymerization conversion, the solids concentration, the pH and the weight average particle diameter of the resulting latex [A2] were measured. The results are shown in Table 1.

EXAMPLE 2B

Example 1B was repeated except that latex [A2] was used instead of latex [A1], and the amount of toluene was changed to 50 parts. The results are summarized in Table 1.

COMPARATIVE EXAMPLE 2

Example 2B was repeated except that the amount of toluene was changed to 1500 parts. When 300 parts of a 1% aqueous solution of hydrochloric acid was added, the latex was coagulated.

EXAMPLE 3A

Example 2A was repeated except that the monomer and the organic solvent were changed as shown in Table 1. A latex [A3] was obtained. The polymerization conversion, solids concentration, pH and weight average particle diameter of latex [A3] are shown in Table 1.

EXAMPLES 3B1 AND 3B2

Example 2B was repeated except that latex [A3] was used instead of latex [A2]; the organic solvent, base and acid used were changed as shown in Table 1; and the temperature of the base treatment and the acid treatment was changed to 60° C. The results are shown in Table 1.

EXAMPLE 4A

Example 2A was repeated except that the amount of deionized water was changed to 468 parts, and the monomers and the organic solvent used were changed as shown in Table 1. Thus, a latex [A4] was obtained. The polymerization conversion, the solids concentration, the pH and the weight average particle diameter were measured. The results are summarized in Table 1.

EXAMPLE 4B1

Example 2B was repeated except that latex [A4] was used instead of latex [A2], and the organic solvent, base and acid used were changed as shown in Table 1. The results are shown in Table 1.

EXAMPLE 4B2

Example 4B1 was repeated except the organic solvent was not used. The results are shown in Table 1.

EXAMPLE 5A

Example 1A was repeated except that the amount of the seed latex [S] was changed to 3.3 parts, and the monomers used were changed as shown in Table 1. A latex [A5] was obtained. The polymerization conversion, the solids concentration, the pH and the weight average particle diameter of the resulting latex were measured, and the results are shown in Table 1.

EXAMPLE 5B1

Example 4B1 was repeated except that latex [A5] was used instead of the latex used in Example 4B1. The results are shown in Table 1.

EXAMPLE 5B2

Example 5B1 was repeated except that the time of treating with the acid was changed to 1 hour. The results are shown in Table 1.

It is seen from the results given in Table 1 that by the process of this invention, polymer particles containing at least one microvoid were obtained; when an organic solvent was not used at the time of latex preparation or after preparing the latex (Comparative Example 1), microvoid-containing particles were not obtained; and that when the organic solvent was used in an amount exceeding the upper limit specified in this invention (Comparative Example 2), the latex was coagulated, and the object of this invention could not be achieved. Furthermore, as shown in Examples 3B1 and 3B2, the process of this invention gives microvoid-containing polymer particles having a high glass transition temperature.

TABLE 1

| Latex | | | Example 1A [A1] | Example 2A [A2] | Example 3A [A3] |
|---|---|---|---|---|---|
| Polymer-ization step | Monomers | Styrene | 94 | 87.7 | 45 |
| | | -Methylstyrene | — | — | 43 |
| | | Divinylbenzene | — | 0.3 | — |
| | | Acrylonitrile | — | — | — |
| | | Methyl methacrylate | — | 5 | — |
| | | Butyl acrylate | — | — | 5 |
| | | Acrylic acid | 6 | — | — |
| | | Methacrylic acid | — | 7 | 7 |
| | Solvent | Toluene | — | 10 | — |
| | | Methyl ethyl ketone | — | — | 10 |
| Properties of the latex | | Polymerization conversion (%) | 97 | 96 | 97 |
| | | Light scattering particle diameter (nm) | 480 | 500 | 510 |
| | | pH | 2.3 | 2.3 | 2.3 |

| | | | Example 1B | Comp. Ex. 1 | Example 2B | Comp. Ex. 2 | Example 3B1 | Example 3B2 |
|---|---|---|---|---|---|---|---|---|
| Microvoid-containing particle producing step | Solvent | Toluene | 30 | — | 50 | 1500 | — | — |
| | | Methyl ethyl ketone | — | — | — | — | 50 | 50 |
| | Base treatment | Base Sodium hydroxide | 3.3 | 3.3 | 3.3 | 3.3 | — | — |
| | | Potassium hydroxide | — | — | — | — | 4.4 | 4.4 |
| | | Treating time (hours) | 3 | 3 | 3 | 3 | 3 | 3 |
| | Acid treatment | Acid HCl | 3.0 | 3.0 | 3.0 | 3.0 | — | — |
| | | Sulfuric acid | — | — | — | — | 4.0 | 4.0 |
| | | Treating time (hours) | 3 | 3 | 3 | 3 | 3 | 3 |
| Microvoid-containing particles | | pH | 2.3 | 2.3 | 2.3 | | 2.3 | 3.7 |
| | | Particle diameter (nm) | 530 | 490 | 530 | | 550 | 530 |
| | | Microvoid diameter (nm) | 150 | No microvoid | 250 | Coagulated | 200 | 100–150 |
| | | Number of microvoids | 1–2 | No microvoid | 1–2 | | 1–2 | 2–6 |
| | | Tg (°C) | 100 | 100 | 108 | | 117 | 117 |

| Latex | | | Example 4A [A4] | Example 5A [A5] |
|---|---|---|---|---|
| Polymer-ization step | Monomers | Styrene | 90 | 95 |
| | | -Methylstyrene | — | — |
| | | Divinylbenzene | — | — |
| | | Acrylonitrile | 3 | — |
| | | Methyl methacrylate | — | 5 |
| | | Butyl acrylate | — | — |
| | | Acrylic acid | — | 7 |
| | | Methacrylic acid | 7 | — |
| | Solvent | Toluene | — | — |
| | | Methyl ethyl ketone | 50 | — |
| Properties of the latex | | Polymerization conversion (%) | 98 | 98 |
| | | Light scattering particle diameter (nm) | 550 | 510 |
| | | pH | 2.2 | 2.2 |

| | | | Example 4B1 | Example 4B2 | Example 5B1 | Example 5B2 |
|---|---|---|---|---|---|---|
| Microvoid-containing particle producing step | Solvent | Toluene | — | — | — | — |
| | | Methyl ethyl ketone | 50 | — | 50 | 50 |
| | Base treatment | Base Sodium hydroxide | — | — | — | — |
| | | Potassium hydroxide | 4.4 | 4.4 | 4.4 | 4.4 |
| | | Treating time (hours) | 3 | 3 | 3 | 3 |
| | Acid treatment | Acid HCl | — | — | — | — |
| | | Sulfuric acid | 4.0 | 4.0 | 4.0 | 4.0 |
| | | Treating time (hours) | 3 | 3 | 3 | 1 |
| Microvoid-containing particles | | pH | 2.3 | 2.3 | 2.3 | 2.3 |
| | | Particle diameter (nm) | 560 | 560 | 560 | 510 |
| | | Microvoid diameter (nm) | 250 | 230 | 250 | 50–150 |
| | | Number of microvoids | 1 | 1–2 | 1 | 4–8 |
| | | Tg (°C) | 103 | 103 | 103 | 103 |

We claim:

1. A process for producing polymer particles containing one microvoid or two or more discrete microvoids, which comprises (1) adding a base to a latex of a carboxyl-modified copolymer containing 10 to 100 parts of an organic solvent per 100 parts by weight of the carboxyl-modified copolymer to neutralize at least part of the carboxyl groups in the copolymer, and (2) adding an acid to the latex to adjust the pH of the latex to not more than 7.

2. The process of claim 1 in which the carboxyl-modified copolymer containing an organic solvent is obtained by adding the organic solvent to the latex after it is produced.

3. The process of claim 1 in which the carboxyl-modified copolymer latex containing an organic solvent is obtained by adding an organic solvent to a polymerization system at the time of producing the carboxyl-modified copolymer latex.

4. Polymer particles containing one microvoid or two or more discrete microvoids obtained by the process of claim 1.

5. The process of claim 1 in which a surface-active agent is added to the latex simultaneously with, or before, the addition of the base to the carboxyl-modified copolymer latex.

6. The process of claim 1 in which a surface active agent is added to the latex simultaneously with, or before, the addition of an acid to the latex treated with the base to neutralize at least part of the carboxyl groups of the copolymer.

7. Polymer particles of claim 4 which have a glass transition temperature of at least 100° C.

8. A latex polymer particles containing one microvoid or two or more discrete microvoids obtained by the process of claim 1.

* * * * *